United States Patent [19]

Newberg

[11] Patent Number: 4,535,262
[45] Date of Patent: Aug. 13, 1985

[54] DYNAMOELECTRIC MACHINE HAVING MEANS FOR DRAINING WATER FROM ENDSHIELD

[75] Inventor: Barry M. Newberg, St. Louis County, Mo.

[73] Assignee: Emerson Electric Co., St. Louis, Mo.

[21] Appl. No.: 646,008

[22] Filed: Aug. 30, 1984

[51] Int. Cl.³ .............................................. H02K 5/00
[52] U.S. Cl. ........................................ 310/88; 310/89
[58] Field of Search ...................... 310/87, 88, 89, 254, 310/90

[56] References Cited

U.S. PATENT DOCUMENTS

| | | | |
|---|---|---|---|
| 3,308,317 | 3/1967 | Allenbaugh | 310/88 |
| 3,846,652 | 11/1974 | Lykes | 310/88 X |
| 4,086,507 | 4/1978 | Roland et al. | 310/88 |
| 4,287,662 | 9/1981 | Otto | 310/88 X |

*Primary Examiner*—Donovan F. Duggan
*Attorney, Agent, or Firm*—Polster, Polster and Lucchesi

[57] ABSTRACT

A dynamoelectric machine (e.g., an induction motor) for use in a dishwasher application or the like is disclosed, with the motor having its rotor shaft extending generally vertically, and having an endshield disposed horizontally. The endshield is so structured as to have an upwardly facing trough or the like formed in the upwardly facing surface of the endshield for channeling water which may drip down onto the endshield radially outwardly away from the rotor shaft to portions of the endshield located out beyond the stator core and windings of the motor. Drain openings or tubes are provided in portions of the endshield out beyond the stator core and windings such that the water channeled to the drain openings is prevented from coming into contact with the stator and windings of the motor.

5 Claims, 6 Drawing Figures

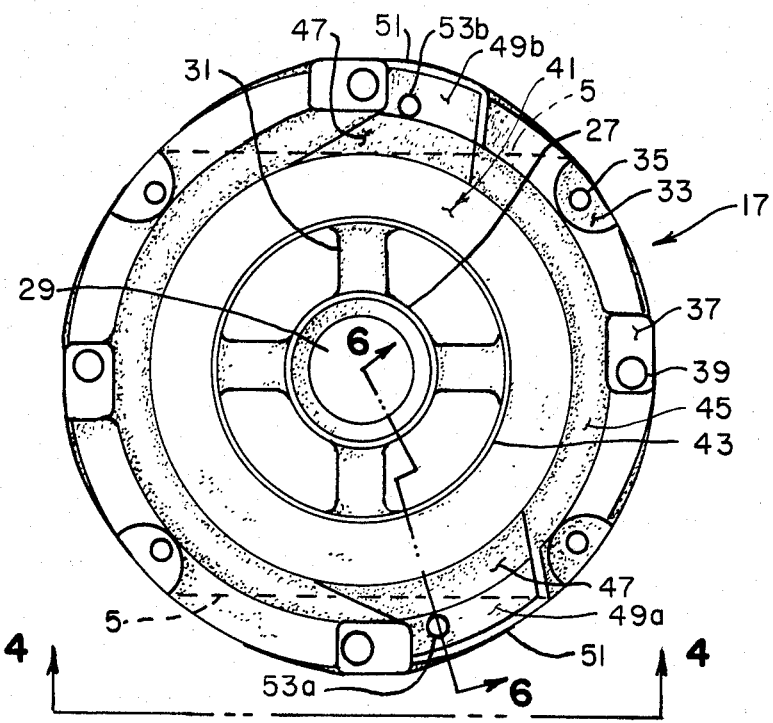
FIG. 3.
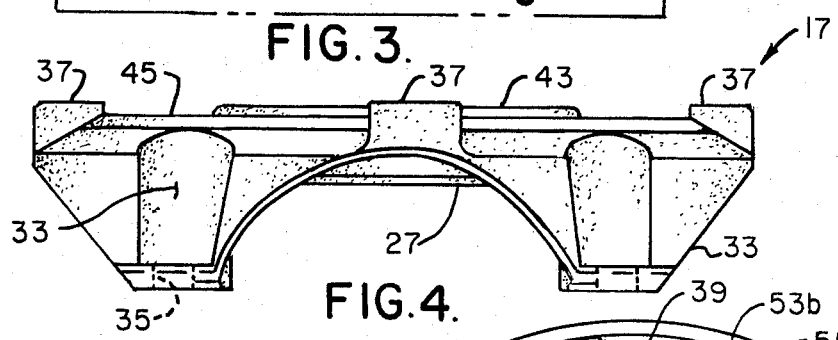
FIG. 4.
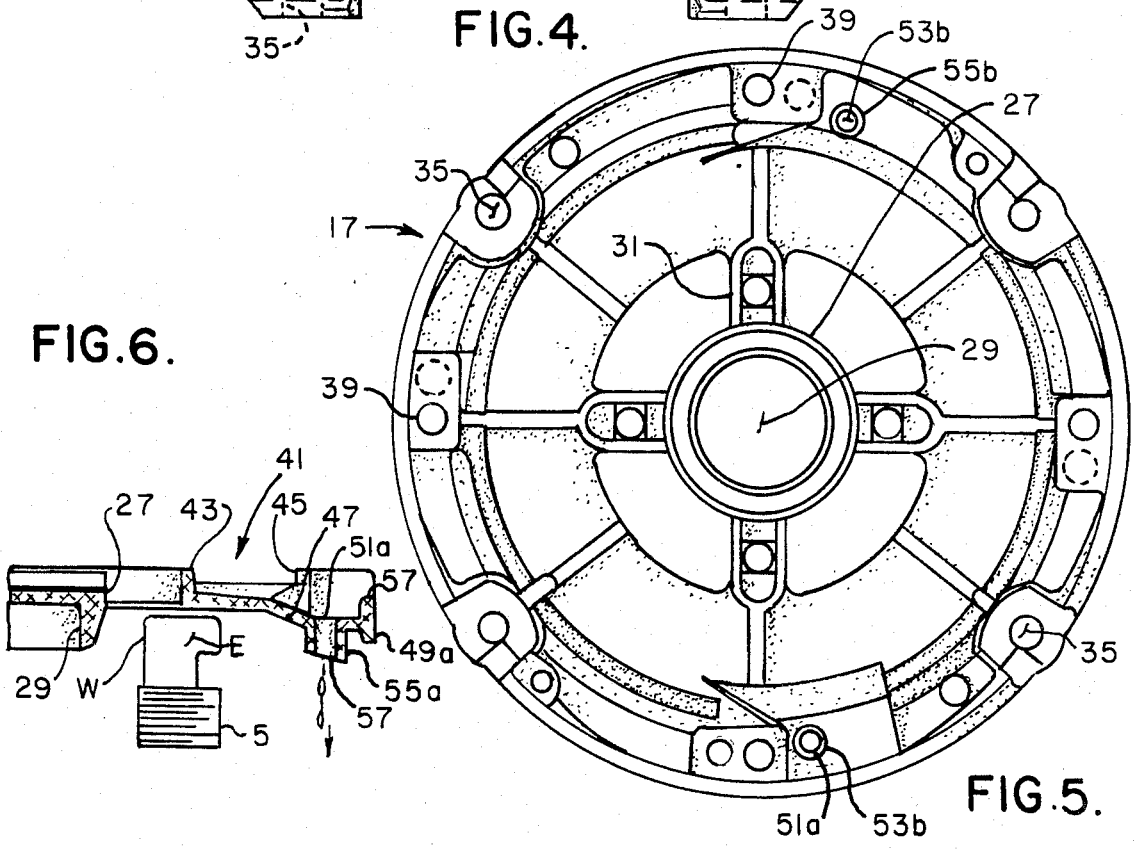
FIG. 5.
FIG. 6.

DYNAMOELECTRIC MACHINE HAVING MEANS FOR DRAINING WATER FROM ENDSHIELD

BACKGROUND OF THE INVENTION

This invention relates to a dynamoelectric machine, and more particularly, to an induction electric motor, having its endshield so structured that when the endshield is facing generally upwardly, the water dripping thereon is directed radially outwardly away from the motor for discharge at a location in which the water will not come into contact with the stator or the windings of the motor.

More specifically, in certain motor applications, such as in dishwasher applications, the motor is mounted to the bottom face of a dishwasher tub or the like, and the rotor shaft of the motor extends vertically into a dishwasher pump or the like. A seal is typically fitted around the rotor shaft so as to prevent water from within the dishwasher from leaking past the seal and falling onto the motor. In the past, small amounts of water (and more specifically, dishwashing detergent solution) may, on occasion, leak past these seals. This leakage may not be sufficient as to cause the homeowner to notice leaking water from the dishwasher. However, the leaking water running down the shaft could have a deleterious effect on the motor.

It had been known to fix a splash guard, such as a disc, to the rotor shaft of the motor between the seal on the rotor shaft and the rotor bearing carried by the endshield. Water leaking past the seal would encounter the drip or splash guard, and would be directed radially outwardly away from the bearing, thus preventing the water from falling directly on the bearing. However, when the water dripped from the drip guard onto the endshield out beyond the bearing, the water would flow generally horizontally, outwardly on the upwardly facing surface of the endshield away from the bearing, until it encountered the edge of the endshield. The water would then flow downwardly along the sides of the endshield. However, since it is conventional to diecast endshields of a suitable metal alloy in a two-part diecasting mold, when the water encountered the parting line formed by the mold halves on the side of the diecasting, the surface tension of the water would cause the water to follow the parting line in a generally downward direction. Oftentimes, the water following the parting line on the sides of the diecasting would be directed onto the end turns of the windings of the motor, and onto the stator iron. Over time, this dripping water on the stator and on the end turns could lead to failure of the motor.

Heretofore, in order to prevent the water from following the parting line on the endshield, it was known to form a step in the parting line. This step in the parting line would disrupt the flow path of the water following the parting line and would cause the water to drip from the parting line at a desired location. However, in order to form the step in the parting line, changes to the diecasting molds were necessary which increased their complexity and expense.

SUMMARY OF THE INVENTION

Among the several objects and features of the invention may be noted the provision of a dynamoelectric machine or electric motor which effectively solves the problem of water drippage onto the endshield of the motor by ensuring that the water is directed to desired drain holes in the endshield at predetermined locations at which the water may be discharged from the endshield clear of the stator and the windings;

The provision of such an endshield which is of one-piece unitary construction, and in which the water drainage means is integral with the endshield;

The provision of such an endshield which does not require the provision of a stepped parting line mold for diecasting of the endshield; and The provision of such an endshield which is a one-piece unitary member, which may be diecast at production rates comparable with the production rates of prior diecast endshields, and which does not utilize any substantial amount of additional metal for diecasting and thus is of little additional extra cost in the production of the motor.

Other objects and features will be in part apparent and in part pointed out hereinafter.

Briefly stated, in a dynamoelectric machine (e.g., an induction electric motor or the like) comprising a stator assembly having a stator core with a central bore therethrough. The core further has a plurality of slots extending radially outwardly from the bore, and a plurality of coils of suitable magnet wire are inserted in the slots and extend out beyond the end faces of the core so as to constitute the windings of the stator assembly. A rotor assembly, including a rotor body received within the bore and a rotor shaft rotatable with the rotor body is journalled relative to the stator by means of an endshield or bearing support secured to the stator core. The dynamoelectric machine is normally disposed in its application with the rotor shaft vertical, and with the outer surface of the endshield facing generally upwardly. The endshield has portions thereof which extend horizontally out beyond the stator core and the endturns of the windings. More specifically, the improvement of this invention is defined to comprise means formed integral with the endshield for channeling water generally radially outwardly away from the rotor shaft to the above-mentioned portions of the endshield which are located out beyond the stator core and the winding endturns. Drain tube means including drain openings therewithin are carried by the portions of the endshields which are disposed out beyond the stator core and the winding endturns, with these drain tubes receiving water channeled generally radially outwardly from the motor and discharging the water at a desired location through the endshield in which it is positively prevented from dripping onto the stator core or the endturn windings.

BRIEF DESCRIPTION OF THE DRAWINGS

FIG. 3 is a top plan view of the endshield, taken along line 3—3 of FIG. 2;

FIG. 4 is a side elevational view of the endshield, taken along line 4—4 of FIG. 3;

FIG. 5 is a bottom plan view of the endshield; and

FIG. 6 is a partial cross sectional view of the endshield, taken along line 6—6 of FIG. 3.

Corresponding reference characters indicate corresponding parts throughout the several views of the drawings.

DESCRIPTION OF A PREFERRED EMBODIMENT

Figure 2:
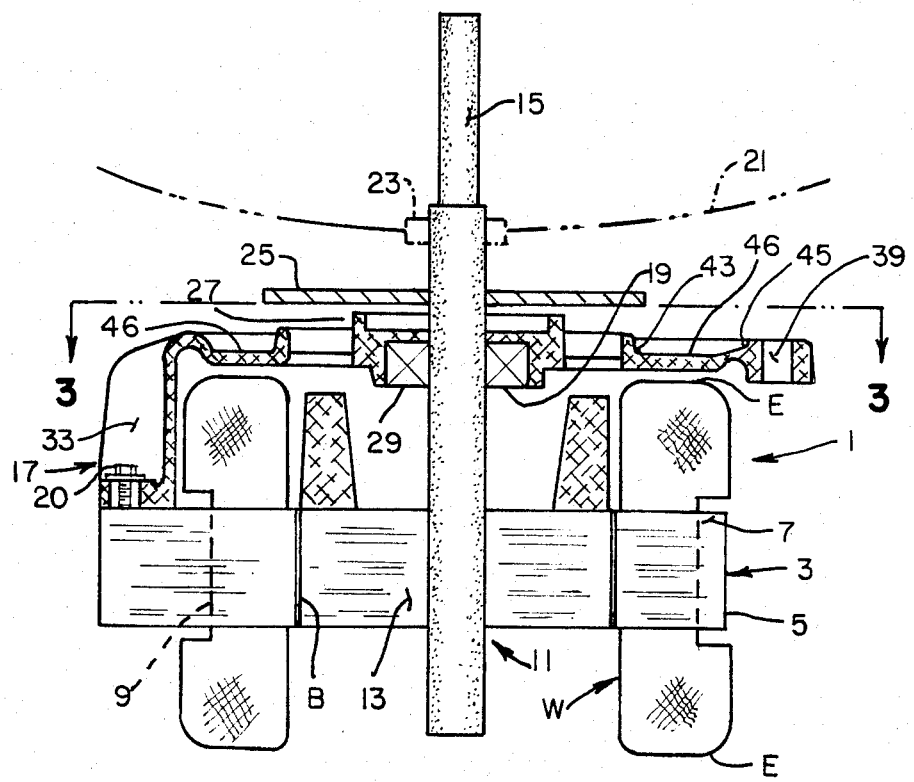
FIG. 2 is a vertical cross sectional view of an electric motor of the present invention, having an upper endshield as shown in FIG. 1.

Referring now to the drawings, a dynamoelectric machine, and more specifically an induction electric motor, is indicated in its entirety by reference character 1. Motor 1 is shown to comprise a stator assembly 3, comprising a core 5 constituted by a stack of laminations 7 of suitable ferromagnetic material, prepunched as to have a central opening therethrough, and to have radial notches extending outwardly from the central opening such that when the laminations are stacked to form core 5, the central openings form a central bore B extending longitudinally through the core, and such that the notches form radial slots 9. A plurality of coils of suitable magnet wire are inserted in radial slots 9 so as to constitute the windings W of the stator assembly. As shown in FIG. 2, the windings W extend out beyond the end faces of stator core 5 and constitute the endturns E of the windings.

Motor 1 further includes a rotor assembly, as generally indicated at 11, comprising a rotor body 13 generally of squirrel cage construction. The rotor assembly further includes a rotor shaft 15 extending out beyond the ends of the rotor body. The motor further includes an endshield 17 at each end of the motor, with the endshield functioning as a bearing support and carrying a suitable bearing 19 for journalling rotor shaft 15 therewithin. Endshield 17 is secured to the end face of core 3 by means of self-tapping screws 20 or the like.

Motor 1 of the present invention is herein shown to be utilized in a dishwasher application in which the motor is oriented with its rotor shaft 15 extending in generally vertical direction, and with the motor mounted to the undersurface of the washing machine tub (as shown in phantom, and as indicated at reference character 21), or to a dishwasher pump assembly (not shown). The rotor shaft 15 is typically sealed relative to the tub by means of a seal 23 (also shown in phantom). It will be understood that rotor shaft 15 may extend directly into a pump assembly or the like provided on the dishwasher. However, for the purposes of disclosure in the present specification, the particular application and the construction of the application are not relevant. Further, a flexible dripguard, as indicated at 25, of flexible sheet synethic resin material, is mounted on rotor shaft 15 and is rotatable therewith. The dripguard prevents any water that may leak past seal 23 from dripping directly onto bearing 19 of the motor.

Turning now to a more detailed description of endshield 17, the endshield is of one-piece diecast construction, molded of a suitable aluminum alloy or the like. The endshield has a central bearing hub 27, having a bearing opening 29 therein for receiving bearing 19, which in turn journals one end of rotor shaft 15. The bearing hub 27 is supported by a plurality (e.g., four) arms 31. Four equally spaced recesses 33 are provided in the outer surface of the endshield, and the bottom ends of these recesses each have a respective bolt opening 35 therethrough for receiving screws 20, such that the endshield may be bolted directly to the end faces of core 5, as shown in FIG. 2. Further, a plurality (e.g., four) of mounting bosses 37 are provided on the upper face of the endshield, with each of these mounting bosses having a respective mounting opening 39 therein. The mounting opening 39 receives bolts or other fasteners (not shown) so as to permit the securement of endshield 17 (and hence motor 1) to the tub structure 21 (or a pump assembly, not shown) of a dishwasher or other application.

Figure 1:
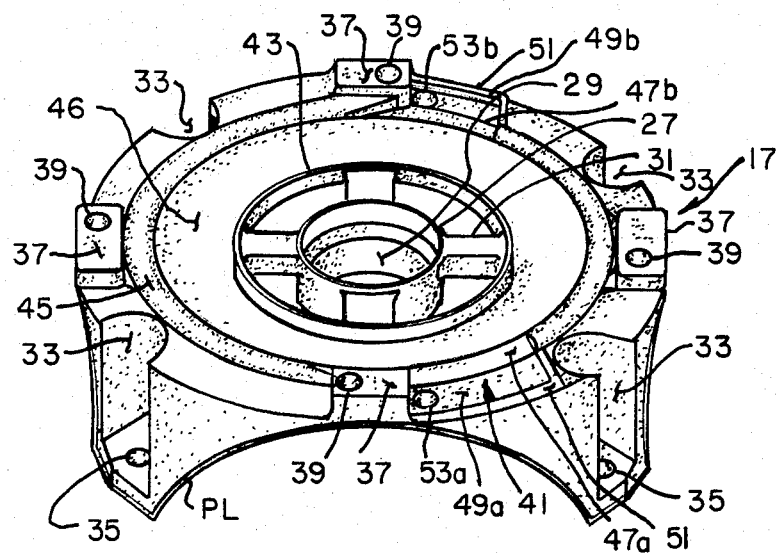
FIG. 1 is a perspective view of an endshield for a dynamoelectric machine of the present invention, having a trough formed in the outer upper face of the endshield for directing water radially outwardly from the shaft, and for discharging the water downwardly through the endshield at predetermined locations in which the discharge water is clear of the stator core and the endturns of the windings.

As best shown in FIGS. 1 and 3, the diecast endshield has a parting line, as indicated at PL, thereon formed during the diecasting operation by the closure of the mating die mold parts (not shown). Oftentimes, excess diecast metal will be present in the location of the parting line PL and, as is typical, this excess metal or flashing is trimmed from the diecast endshield prior to its use in motor 1. However, the parting line PL nevertheless exists, and usually takes the form of an outwardly projecting ridge or the like. In prior art diecasting endshields utilized in dishwasher applications or the like, water dripping onto the endshield would typically flow along the generally horizontal upper end face of the endshield until it reached the end of this upper surface, at which point it would begin to descend along the side walls of the endshield. However, upon the dripping water encountering the parting line, the water would then follow the parting line until it reached the lowest point on the endshield, at which point it would drip downwardly. Typically, the location at which it dripped downwardly would cause the water to drip directly onto the endturns or other structure of the motor which may be deleteriously affected by water dripping thereon. It is a primary object of the present invention to positively ensure that any water leaking onto the upper face of endshield 17 is directed to a location and drained from the endshield at this desired location in such manner that the water will not drip onto the endturns or onto any other components of the motor which may be deleteriously affected by the dripping water.

Toward that end, means, as generally indicated at 41, is provided in endshield 17 for channeling water dripping onto the generally horizontal, upwardly facing surface of the endshield to a location for drainage from the endshield, at which point the drained water will not drip onto the endturns E, the windings W, core 5, or any other components of the motor which may be harmed by the prolonged dripping of water thereon. More specifically, this water channeling means 41 is shown to be constituted by an inner circumferential wall 43 generally proximate the outer ends of arms 31 supporting hub 27 of the endshields. Further, an outer wall 45, spaced radially outwardly from inner wall 43, is provided, and thus a generally annular channel 46 between the inner and outer walls is provided. As best shown in FIG. 2, this annular channel is disposed beneath the outer edges of dripguard 25 such that water directed radially outwardly by the dripguard will drip into the channel 46.

Water channeling means 41 further includes a pair of generally diametrically opposed ramps 47a, 47b, leading downwardly and radially outwardly from channel 46 on opposite sides of the endshield. These ramps 47a, 47b lead to a respective drain wells 49a, 49b, with the outer edges of the above-mentioned wells being defined by a well wall 51. A respective drain opening 53a, 53b is provided in each of the wells 49a, 49b, with each of the drain openings being in communication with a respective drain tube 55a, 55b (as best shown in FIGS. 5 and 6). As best shown in FIG. 6, each of the drain tubes 55a, 55b has a beveled lower end 57 thereby to ensure that water drains directly vertically downwardly from the bottom face of the drain tube.

As best shown in FIG. 3, wells 49a, 49b are located out beyond the ends of stator core 5 such that drain openings 53a, 53b are outboard of the core, the endturns E of windings W, and any other structure of the motor which may be adversely affected by the prolonged dripping of water thereon. Thus, as water drains downwardly away from the endshield 17, it will drip clear of the windings, endturns, and other components of the motor which may be deleteriously affected by the dripping of water thereon.

In this manner, it can be seen that means 41 positively prevents unwanted water that may leak onto the upper face of endshield 17 from running outwardly to the outer edges of the endshield, and then encountering and following part line PL. Instead, the endshield with means 41 of the present invention channels the water dripping onto the upwardly facing surfaces of the endshield to a desired location thereon at which point it is drained from the motor such that it drips harmlessly clear of any motor components that may be harmed by the water.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

What is claimed is:

1. In a dynamoelectric machine comprising a stator having a stator core, with the latter having a central bore therethrough, said stator core having a plurality of slots extending generally radially outwardly from said bore, and a plurality of windings inserted in said slots and extending out beyond the end faces of said core, a rotor assembly including a rotor body received within said bore, and a rotor shaft rotatable with said rotor body, said dynamoelectric machine further comprising endshield means secured to said core for rotatably journalling said rotor shaft relative to said core, said dynamoelectric machine being normally disposed in its application with said rotor shaft in a generally vertical direction, and with said end shield facing generally upwardly, said endshield means having portions thereof extending out beyond said stator and said windings, wherein the improvement comprises: means formed integral with said endshield means in the outer, upwardly facing surface thereof for channeling water generally radially outwardly away from said rotor shaft to said portions of said endshield means out beyond said stator and windings, and drain opening means in said portions of said endshield means out beyond said stator and windings, said drain means receiving water from said portions of said endshields and extending down below said endshields so as to permit the drainage of water away from said endshield means in a direction clear of said stator and said windings.

2. In a dynamoelectric machine as set forth in claim 1 wherein said endshield means has a channel for receiving and accumulating water dripping on the upper, generally horizontal face of the endshield, and for directing it radially outwardly to said portions of said endshield means out beyond said stator core and said windings.

3. In a dynamoelectric machine as set forth in claim 2 wherein said endshield means includes a well in communication with said channel for receiving said water directed generally radially outwardly on said upwardly facing surface of said endshield means, said wells being located generally proximate said portions of said endshield means extending out beyond said stator core and said windings.

4. In a dynamoelectric machine as set forth in claim 3 further comprising a drain tube in communication with said drain opening, said drain opening being located in said well.

5. In a dynamoelectric machine as set forth in claim 1 wherein said drain tubes extend generally vertically downwardly from the portions of said endshield means out beyond said stator core, the bottom end face of said drain tubes being beveled.

* * * * *